United States Patent
Michel

(10) Patent No.: US 7,146,429 B2
(45) Date of Patent: Dec. 5, 2006

(54) COOPERATIVE ADAPTIVE WEB CACHING ROUTING AND FORWARDING WEB CONTENT DATA REQUESTING METHOD

(75) Inventor: Bartlett Scott Hudson Michel, Los Angeles, CA (US)

(73) Assignee: The Aerospace Corporation, El Segundo, CA (US)

( * ) Notice: Subject to any disclaimer, the term of this patent is extended or adjusted under 35 U.S.C. 154(b) by 747 days.

(21) Appl. No.: 09/810,303

(22) Filed: Mar. 16, 2001

(65) Prior Publication Data

US 2002/0133570 A1  Sep. 19, 2002

(51) Int. Cl.
G06F 15/173 (2006.01)

(52) U.S. Cl. ..................................... 709/238
(58) Field of Classification Search ............... 709/238, 709/223, 203
See application file for complete search history.

(56) References Cited

U.S. PATENT DOCUMENTS

| | | | | |
|---|---|---|---|---|
| 5,774,660 A * | 6/1998 | Brendel et al. | ............. | 709/201 |
| 5,864,671 A * | 1/1999 | Hagersten et al. | .......... | 709/213 |
| 5,878,218 A * | 3/1999 | Maddalozzo et al. | ....... | 709/213 |
| 5,884,038 A * | 3/1999 | Kapoor | ....................... | 709/226 |
| 5,944,780 A * | 8/1999 | Chase et al. | ................ | 709/201 |
| 5,983,227 A * | 11/1999 | Nazem et al. | ................ | 707/10 |
| 6,052,718 A * | 4/2000 | Gifford | ....................... | 709/219 |
| 6,112,248 A * | 8/2000 | Maciel et al. | ............... | 709/238 |
| 6,128,279 A * | 10/2000 | O'Neil et al. | ............... | 370/229 |
| 6,154,738 A * | 11/2000 | Call | .............................. | 707/4 |
| 6,167,438 A * | 12/2000 | Yates et al. | .................. | 709/216 |
| 6,185,598 B1 * | 2/2001 | Farber et al. | ............... | 709/200 |
| 6,189,043 B1 * | 2/2001 | Buyukkoc et al. | .......... | 709/241 |
| 6,304,913 B1 * | 10/2001 | Rune | ........................... | 709/241 |
| 6,311,216 B1 * | 10/2001 | Smith et al. | ................ | 709/226 |
| 6,681,298 B1 * | 1/2004 | Tso et al. | ................... | 711/133 |
| 6,850,980 B1 * | 2/2005 | Gourlay | ....................... | 709/226 |
| 2002/0007413 A1 * | 1/2002 | Garcia-Luna-Aceves et al. | | 709/229 |
| 2006/0117093 A1 * | 6/2006 | Aviani et al. | ............... | 709/217 |

OTHER PUBLICATIONS

High Tech Dictionary; "Definition for Mirror"; Jan. 8, 2001; "http://web.archive.org/web/20010108100100/http://www.computeruser.com/resources/dictionary/definition.html?lookup=3702".*

* cited by examiner

Primary Examiner—Jeffrey Pwu
Assistant Examiner—J. Bret Dennison
(74) Attorney, Agent, or Firm—Derrick Michael Reid

(57) ABSTRACT

Adaptive cooperative web caches construct and maintain routing and forwarding tables for efficient location of replicated web content data, thus reducing the time taken to fetch the requested web content data. The routing and forwarding tables in particular store decomposed web content identifiers and use compression techniques for efficient translation from a user request to the internet protocol address of the cache server where the replicated web content data can be retrieved.

15 Claims, 7 Drawing Sheets

USER CACHE ROUTER AND WEB SERVER NETWORK

USER CACHE ROUTER AND WEB SERVER NETWORK

APPLICATION-LEVEL NETWORK

UNIVERSAL RESOURCE LOCATOR DECOMPOSITION TREE

| Hash Code | Component | Value |
|---|---|---|
| h1 | http | 0003df9d |
| h2 | org | 00074bea |
| h3 | aero | 00074587 |
| h4 | www | 0006a081 |
| h5 | CSTS | 000785e2 |
| h6 | CSRD | 000424c2 |
| h7 | people.html | 000465dc |

UNIVERSAL RESOURCE LOCATOR COMPONENT
HASH CODE VALUE TABLE

FIG. 4A

| Hash Code | Component | Value |
|---|---|---|
| h1 | http | 0003df9d |
| h2 | org | 00074bea |
| h3 | aero | 00074587 |
| h4 | www | 0006a081 |
| h8 | * | 00006432 |

UNIVERSAL RESOURCE LOCATOR WILDCARD
COMPONENT HASH CODE VALUE TABLE

FIG. 4B

UNIVERSAL RESOURCE LOCATOR FORWARDING TABLE

ROUTING PROTOCOL DATA STRUCTURE

ROUTING PROTOCOL MESSAGE SEQUENCE

WEB CACHE APPLICATION LEVEL ROUTING AND FORWARDING PROCESS

COOPERATIVE ADAPTIVE WEB CACHING ROUTING AND FORWARDING WEB CONTENT DATA REQUESTING METHOD

REFERENCE TO RELATED APPLICATIONS

The present application is related to applicant's copending application entitled Cooperative Adaptive Web Caching Routing and Forwarding Web Content Data Broadcasting Method, Ser. No. 09/812,139, filed Mar. 19, 2001, by the same inventor.

FIELD OF THE INVENTION

The invention relates to the field of internet web caching and application level routing and forwarding in peer to peer services and systems. More particularly, the present invention relates to adaptive and cooperative web caching using routing protocols, broadcasting and compression techniques for efficient storage and creation of forwarding tables used for forwarding requests within an adaptive and cooperative web caching system.

BACKGROUND OF THE INVENTION

Web caching is generally recognized as an important service for alleviating focused overloads when certain web content data stored on a web server become popular. A user will have a user internet protocol address (IPA) and will select a uniform resource locator (URL) identifying the sought after web content data and the corresponding web server storing the web content data. The user makes use of the domain name system (DNS) and is provided with a DNS server IPA. The DNS system cross references a web server name, contained in a URL, to the corresponding destination web server IPA. The web server name and user IPA are transmitted to a DNS server at the DNS IPA. The DNS server then returns to the user at the user IPA the destination IPA of the web server storing the sought after URL web content data. The user then transmits the user IPA, the destination IPA and URL as a hypertext transport protocol (HTTP) protocol message into the internet where the http message is routed and forwarded through internet routers to the web server at the destination IPA where the web server then returns to the user at the user IPA the requested URL web content data. Web caching introduces a web content data cache store proximal to the user to reduce retrieval time latency of sought after URL web content data.

A web caching system consists of one or more caches that store copies of web pages, images and other web content data with the expectation that the stored copies will be repeatedly requested. A purpose of the web caching system is to reduce both the number of requests received by a web server where the desired content data is located, while providing a faster web interaction experience for the user. The web caching system reacts and adapts to user browsing behavior. Hot spots develop from time to time when user browsing behavior creates network congestion in the internet topological vicinity of and sustained workload at a particular web server. The JPL Mars Pathfinder landing, the Starr Report, and downloads of updated Netscape Communicator, a trademark of Netscape, and Internet Explorer, a trademark of Microsoft, browsers are several examples of activity that previously generated internet wide hot spot events. A more recent phenomenon are short lived hot spots caused by the traffic generated by portal sites, typically news and sports services, where the web content data is periodically changed and updated during the course of the day causing users to periodically refresh their copy of the web content data.

Web caching systems may be designed as stand alone or cooperative systems. The difference between these two types of caching systems is whether or not a cache interacts with another cache while processing a user's request. Each user request for web content data is identified using the URL. When a proximal stand alone cache receives a user request, the proximal stand alone cache checks whether or not the URL web content data is locally stored, either in the proximal stand alone cache memory and disk storage devices. If the URL web content data is locally stored by the stand alone cache, the URL web content data is immediately sent back to the requesting user. Otherwise, the proximal stand alone cache fetches the URL web content data directly from the designated web server.

A cooperative caching system, by contrast, is a system where web caches interact with each other in order to share stored web content data. When a proximal cooperative cache receives a user request, the proximal cache also checks whether or not the URL web content data was previously and locally stored. Again, if the proximal cooperative cache has stored the URL web content data, the URL web content data is sent to the requesting user. If the URL web content data is available from another distal cooperative cache, the proximal cache sends the user request to the distal cooperative cache. Otherwise, the proximal cache fetches the URL web content data from the designated web server.

The Squid web caching system is an example of a cooperative web caching system. In the Squid system, caches are grouped together in peer hierarchical groups, where the peer groups have a parent and child relationship with each other. A proximal cache in the Squid web caching system first checks to see if a user requested URL web content data is stored locally. If the URL web content data is not locally stored by the proximal cache, the proximal cache sends the request to all caches in the proximal cache peer group. If the proximal sending cache does not receive a reply from any cache in the peer group, the proximal cache sends the user request to a distal cache in the parent peer group. The process of checking whether the URL web content data is locally stored, querying the other caches in the peer group, and subsequently sending the user request to the next parent peer group repeats when the URL web content data is not stored by the cache or any of the caches in the peer group. The process stops when a root peer group is encountered, that is, a peer group that does not have a parent peer group. A cache in the root peer group also checks whether the requested URL content data is locally stored, and if not, the cache in the root peer group fetches the requested URL content data directly from the web server named in the URL. The URL web content data is stored by the root peer group cache and sent from the root peer group cache back to the cache that relayed the user request to the root peer group. The URL web content data is subsequently stored and propagated down through the caches in the peer groups through which the user request was relayed until the URL web content data reaches the proximal cache that originally received the request from the user, at which time, the proximal cache sends the URL web content data to the user. The disadvantage of this cooperative caching system is that the caches do not forward user requests between peer groups other than following the peer group hierarchy. These and other disadvantages are solved or reduced using the present invention.

SUMMARY OF THE INVENTION

An object of the invention is to provide a method for accessing requested web content data that is stored in a network of distributive caches and is identified by an uniform resource locator (URL).

Another object of the invention is to provide a method for accessing URL requested web content data stored in a network of distributive caches.

Yet another object of the invention is to provide a method for accessing URL requested web content data stored in distributed caches by application level routing and forwarding.

Still another object of the invention is to provide a method for accessing URL requested web content data using adaptive and cooperating web caching using forwarding tables for routing URL requests and internet protocol addresses (IPAs) between distributed web caches.

Still a further object of the invention is to provide a method for accessing URL requested web content data using adaptive and cooperating web caching using forwarding tables and URL wildcard characters for routing a collection of URL requests and internet protocol addresses (IPAs) between distributed web caches for accessing a respective set of web content data.

Yet a further object of the invention is to provide a method for expressing URLs as URL identifiers for adaptive and cooperative web caching.

Still another object of the invention is to provide a method for expressing URLs as URL identifiers for adaptive and cooperative web caching using URL decomposition, URL wildcards, and URL compression.

Yet another object of the invention is to provide a method for creating forwarding tables using encoding for representing URLs for forwarding URL requests to adaptive cooperative distributed web caches.

Yet another object of the invention is to provide a method for creating forwarding tables using hash function encoding for representing URLs for forwarding URL requests to adaptive cooperative distributed web caches.

A still further object of the invention is to provide a method for creating forwarding tables using a table data structure that decomposes URLs for cross referencing URLs to web cache IPAs for forwarding URL requests to adaptive cooperative distributed web caches.

A still further object of the invention is to provide a method for creating forwarding tables using hash function encoding to address forwarding information in forwarding tables.

Still a further object of the invention is to provide a method for communicating URLS, IPAs and relative web hop distances between distributed web caches storing sought after web content data using an application level routing protocol containing a forwarding list of URLs, IPAs and web cache distance metrics for adaptively maintaining forwarding tables for forwarding and relaying URL requests to the distributed web caches that locally store requested web content data.

Yet another object of the invention is to provide a method for broadcasting URLs, IPAs and relative web hop distances between distributive web caches storing sought after web content data using an application level routing protocol containing a routing protocol forwarding list of URLs, IPAs and web cache distance metrics for adaptively maintaining forwarding tables for forwarding URL requests to the distributed web caches that locally store the requested web content data for replicating web content data in a plurality of adaptive cooperating distributed web caches.

The invention is directed to an adaptive and cooperative web caching method that is an application level routing and forwarding method used to achieve efficient access, forwarding and location of replicated web content data using a web caching system comprising a plurality of adaptive and cooperating distributive web caches. The adaptive and cooperative web caching method is suitable for reducing retrieval delays of sought after web content data in response to web user requests. This web retrieval delay, or latency, is reduced by the rapid determination of cache IPAs cross referenced to URLs in each adaptive forwarding table of the adaptive and cooperative web caches.

A request receiving proximal cache receives user web requests from a user's browser or other web access device that was previously configured or directed to communicate with the proximal receiving cache instead of directly retrieving web content data from the web server identified by a URL contained in the user web request. A request receiving proximal cache operates as a stand alone cache when receiving a user request containing a URL and then determining whether the URL web content data is stored locally within the cache. When the user requested URL web content data is stored locally within the proximal cache, the URL web content data is immediately communicated back to the user. In directly responding to user requests, the proximal web cache functions as does a conventional stand alone web cache.

The proximal web cache however also maintains a forwarding table for cross referencing URL and IPAs for locating distal cooperative web caches also storing the sought after web content data. When the URL of the sought after web content data is not cross referenced to an IPA in the proximal web cache, the proximal web cache continues to function as a stand alone cache and directly retrieves web content data referred to by the URL from the web server that originally and permanently stores the requested web content data by addressing the web server using the conventional domain name system (DNS) protocol that translates the web server name into a web server IPA and by communicating with the web server IPA using the necessary transport and application protocols appropriate to the URL. Then the proximal web cache stores the web content data from a web server and the proximal web caches further continues to function as a stand alone cache. The forwarding table is not used when storing requested web content data from a web server as the proximal cache does not need a forwarding table to recognize those URLs that identify locally stored web content data.

In a first aspect of the invention, a web cache may additionally function to adaptively replicate requested web content data by storing web content data received from an associated distal web cache in response to frequent requests or anticipated user activity, thereby causing other distal adaptive and cooperative caches to update the respective forwarding tables of the distal caches so that future user requests for the requested web content data are retrieved directly from or routed through one or more intermediate adaptive and cooperative distal web caches to that distal web cache that distally but there locally stores the requested web content data. When the sought after web content data is not stored in the receiving proximal web cache, the proximal web cache uses the locally stored forwarding table to cross reference the URL to an IPA of a cooperative distal web cache that distally but there locally stores the requested web content data. When requested web content data is stored by an associated distal web cache, the forwarding table is then used by the receiving proximal cache to recognize those URLs having corresponding web content data stored in the distal web caches efficiently locating where users requested web content data has been previously stored in a system of adaptive distributive cooperative web caches.

In a second aspect of the invention, a proximal web cache may further function to broadcast routing information to cooperative distal web caches that can then adaptively update the distal but there locally stored forwarding tables of the receiving distal web caches to provide adaptive updates to the forwarding tables through the distributive web cache system for efficient subsequent routing of URL requests to other cooperative distal web caches in the application level network of adaptive and cooperative distributed web caches. The proximal web cache broadcasts in packets a routing protocol forwarding list defined by a routing protocol data structure. The routing protocol forwarding list contains URLs, IPAS, and metric distances data indicating where web content data is stored in the system of cooperative distributive web caches. The forwarding list IPAs are preferably locations of cooperative forwarding distal web caches that relay during web hops URL requests to a distal web cache storing the sought after URL web content data, but can be the locations of distal web caches or web servers storing the web content data.

In the first two aspects, the invention is a method directed to the efficient location and accessing of web content data in an adaptive cooperative distributed web caching system using an application level web cache routing protocol. The routing protocol is used to exchange location information between cooperative web caches. The web cache routing protocol is defined by a routing protocol data structure and communicated in a sequence of routing protocol packets exchanged between the cooperative web caches. The protocol data structure of the web cache routing protocol includes the IPA of the broadcasting proximal cache, the broadcast IPA corresponding to a group of one or more recipient cooperative distal caches, and includes the routing protocol forwarding list comprising URLs, respective distal content storing web cache IPAs and distance metrics. The URL and IPA respectively identify web content data and location of a storing web server or cooperative storing distal web cache. The distance metric indicates the number of web cache hops required to reach the storing web server or storing distal web cache from the proximal web cache receiving the forwarding list. As the routing protocol forwarding list is communicated through successive cooperative web caches, the distance metric is incremented so that the current value of the distance metric is equal to the number of required web cache hops from the current web cache receiving the forwarding list to the web cache or web server where the web content data associated with the respective URL in the forwarding list is stored, so that, each recipient, in turn, then knows the required number of web cache hops to the storing cooperative distal web cache or web server. The distance metric, and hence, the number of web cache hops, is incremented when traversing from one to another cache and between local groups of cooperative web caches, with the cooperative web caches being organized into interconnected and overlapping groups of web caches that define the network topology of the system of adaptive and cooperative web caches. A proximal cache may periodically send routing information to the distal caches in the local groups in which the proximal cache is a member. A cache within one group can broadcast routing information to all other caches within the local group. A cooperative web cache can be a member of a plurality of local groups of caches to overlap the groups of cooperative caches for effectively communicating URL requests and web content data between the groups of caches. In this manner of overlapping groups of caches, routing information can propagate through one or more groups of cooperative web caches during web hops throughout the entire network of cooperative distributive web caches.

A third aspect of the invention is the decomposition of exact and wildcard URLs into a sequence of URL components to efficiently represent a URL decomposition tree in the proximate web cache forwarding table. An exact URL is a character string composed of a scheme portion, a web server name portion, a path portion, and a type portion indicating a file format, in combination, corresponding to the web content data originally and permanently stored by a web server. The web server name portion in an exact URL that is further decomposed into name components reflecting a hierarchical naming convention defined by the conventional domain naming system (DNS). The path portion in an exact URL is further decomposed into one or more path components. Hence, a decomposed exact URL is a sequence of components consisting of a scheme component, name components, path components and a type component. The scheme portion typically includes only one scheme component. The type portion typically include only one type component. Hence, each URL portion comprises one or more URL components.

A wildcard URL is a string composed of either a scheme, a web server name, and path terminated by a wildcard character or a scheme and a web server name containing a wildcard character. A wildcard character terminating the path of a wildcard URL represents a group of exact URLs and associated web content stored in a distal web cache or a web server. A wildcard character occurring in the web server name of a wildcard URL represents a group of web servers and the groups of exact URLs and associated web content data originally and permanently stored by the group of web servers. Hence, a decomposed wildcard URL is a sequence of URL components consisting of a scheme component, name components and optionally path components terminating with the wildcard component.

A URL decomposition tree is a data structure that stores a collection of decomposed exact and wildcard URL components that preserves the sequential ordering of decomposed exact and wildcard URL components. The decomposition tree serves to reduce unnecessary duplication of decomposed exact and wildcard URL components already stored in the URL decomposition tree. The proximal cache forwarding table stores a URL decomposition tree by inserting the URL components from decomposed URLs contained in the forwarding table. The forwarding table links decomposed URL components to the preceding decomposed URL components to form a complete exact or wildcard URL. The first decomposed URL component, that is, the scheme component, is not linked to a preceding decomposed URL component. The final decomposed URL component, that is typically a wildcard component or a type component, in addition to being linked to the preceding decomposed URL component, is linked to the IPA of the distal cache with the minimum web cache distance metric as learned from the web cache routing protocol.

A fourth aspect of the invention is the use of URL encoding for effectively storing URL identifiers in the forwarding table. URL encoding is preferably hash function encoding used to efficiently store compressed URLs for identifying the URLs. Exact URLs, wildcard URLs, and compressed URLs are referred to herein collectively as URL identifiers. The URL identifiers serve to cross reference, that is, locate and access decomposed URLs. The compressed URL identifiers are cross referencing indices into the forwarding table and represent a decomposed URL with or without storing the URL components so as to effectively store the URL decomposition tree of linked decomposed URLs. The URL forwarding table is a representation of the URL decomposition tree for rapidly and efficiently determining the IPA of and metric distance to a web server or distal cache locally there storing the sought after web content data.

In the preferred form, a decomposed URL is transformed into a sequence of hashing code values by a hashing function. A hashing function converts an input string of URL components into an output number within a finite range. The sequence of hashing codes indexes successive decomposed URL components in the proximal cache forwarding table for reducing the time required to search the proximal web cache forwarding table when determining the IPA and metric distance of the forwarding cache or the distal cache storing the sought after web content data. The sequence of hash codes are used primarily to compress an exact or wildcard URL into a coded URL identifier and secondly to locate the decomposed URL in the URL decomposition tree in the forwarding table. The forwarding table can then be efficiently used for locating the IPA and metric distance of a distal cache storing sought after web content data, and also used for efficiently generating the routing protocol forwarding list during broadcasting.

The adaptive web caching method of the present invention efficiently expresses the URLs as URL identifiers referring to web content data stored in an adaptive and cooperative web caching system by URL decomposition, wildcard truncation, and URL compression methods. These methods provide application level web cache routing protocols to maintain cooperative web cache forwarding tables in order to direct URL requests to identified web caches and servers for accessing or replicating web content data. The adaptive cooperative web caching method provides for the access of requested web content data from any of the cooperative web caches, provides for the broadcasting of routing information for adaptively updating forwarding tables, provides for the forwarding of URL requests to cooperative caches using a forwarding table of decomposed URLs cross referenced to IPAs, and provides for the encoding and compression of exact and wildcard URLs into compressed URLs for rapid cross referencing of a requested URL to web server or web cache IPA for reducing web content data retrieval latency times. These and other advantages will become more apparent from the following detailed description of the preferred embodiment.

BRIEF DESCRIPTION OF THE DRAWINGS

FIG. 4A is a hash code value table of a hash code sequence generated by from an exact URL.

FIG. 4B is a hash code value table of a hash code sequence generated by from a wildcard URL.

DETAILED DESCRIPTION OF THE PREFERRED EMBODIMENT

Figure 1:
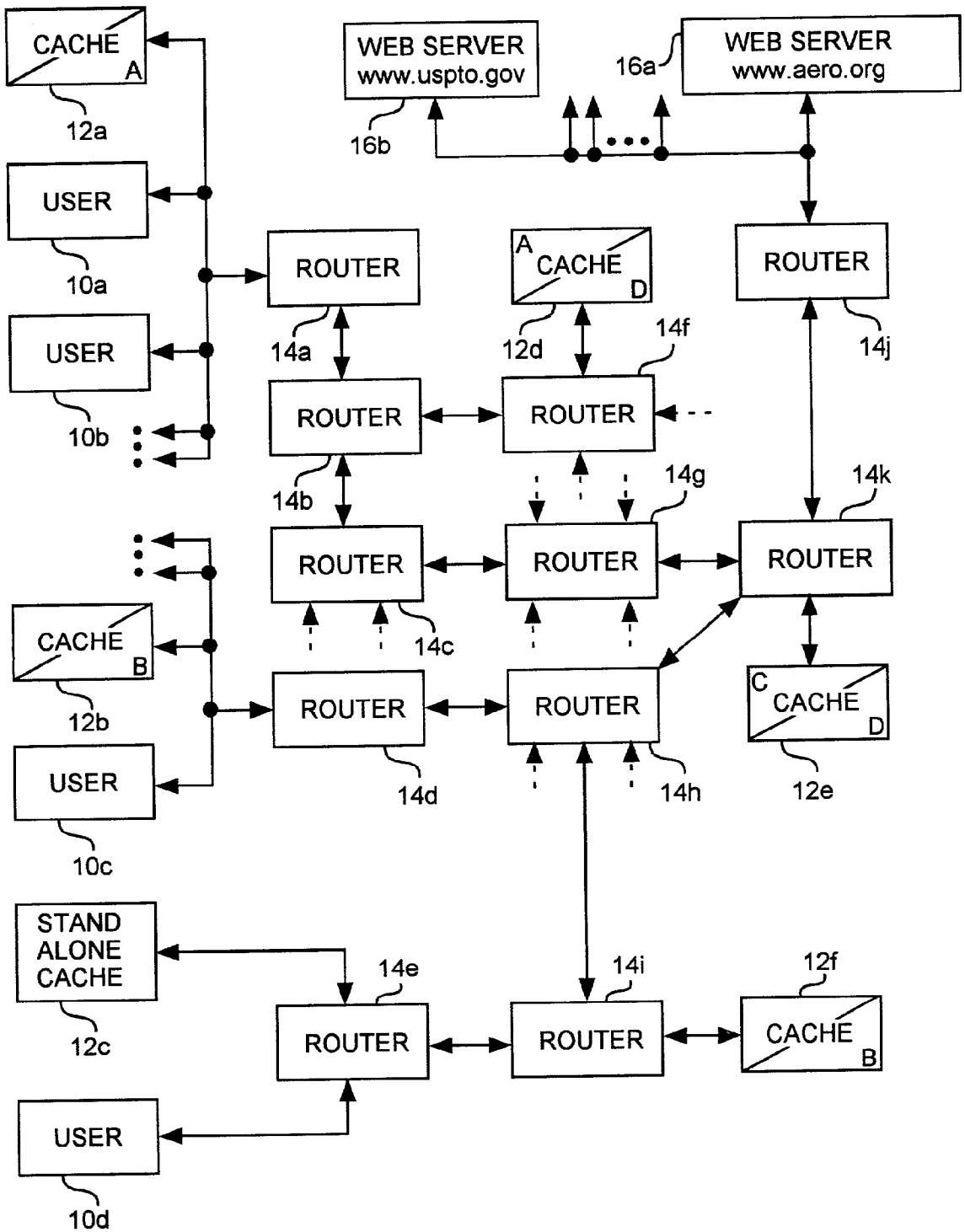
FIG. 1 is a block diagram of a user cache and web server network depicting web caches in the internet.

An embodiment of the invention is described with reference to the figures using reference designations as shown in the figures. Referring to FIG. 1, users 10a, 10b, 10c and 10d collectively referred to simply as users or user, caches 12a, 12b, 12c, 12d, 12e and 12f, collectively referred to simply as caches or a cache, routers 14a, 14b, 14c, 14d, 14e, 14f, 14g, 14h, 14i, 14j, and 14k, collectively referred to simply as routers or a router, and web servers such www.aero.org 16a and www.uspto.gov 16b, collectively referred to simply as servers or a server, are generally accessible on the internet represented as interconnecting lines extending between the users, caches, routers and servers. The web is a collection of web servers that utilize a hypertext transport protocol (http) for accessing web content data stored on the web servers. The internet is an interconnecting medium through which http requests and web content data are communicated between users and web servers. Users, routers, caches and servers have a unique internet protocol address (IPA) typically assigned from a block of consecutive IPAs provided by an internet provider service (IPS). A router is a device that directs data packets between users, caches and servers based on source and destination IPAs in each data packet. A user can enter a uniform resource locator (URL) for addressing and accessing a server by entering the URL into a locally operating browser, such as Internet Explorer® a trademark of Microsoft Corporation and Netscape Communicator® a trademark of Netscape Corporation. The uniform resource locator (URL) is a web address that identifies a web server and respective server web content data. A URL is a request located within an http protocol message. The http message with the URL and web content data are segmented into one or more data packets during communication through the routers on the internet where each data packet contains both source and destination IPAs that identify the source and destination of communicated data packets. A web server stores respectively web content data that is addressed by a respective URL. The server is identified by a unique IPA and the particularly sought after web content data is identified by a respective URL. Hence, the URLs of a server are related by the IPA of the server.

The URL is segmented into a scheme component, name components, a path components and a type component. The scheme component identifies the protocol such as hypertext transport protocol (http) or file transport protocol (ftp) used to transfer the sought after web content from the server to the user. The name components identifies the server and corresponds to a respective IPA. The path components identify the particular sought after server content data. The type component identifies the format type of web content data.

A web cache functions to locally store within the cache a plurality of web content data of a respective plurality of URLs. The routers can route http protocol messages to a localized web cache for access to locally stored web content data without having to route the http protocol message through multiple routers to the identified web servers that permanently stores the respectively URL addressed web content data. Hence, the web caches serve as intermediate web content data stores for the efficient access of web content data identified by the URL requests in the http messages.

Figure 2:
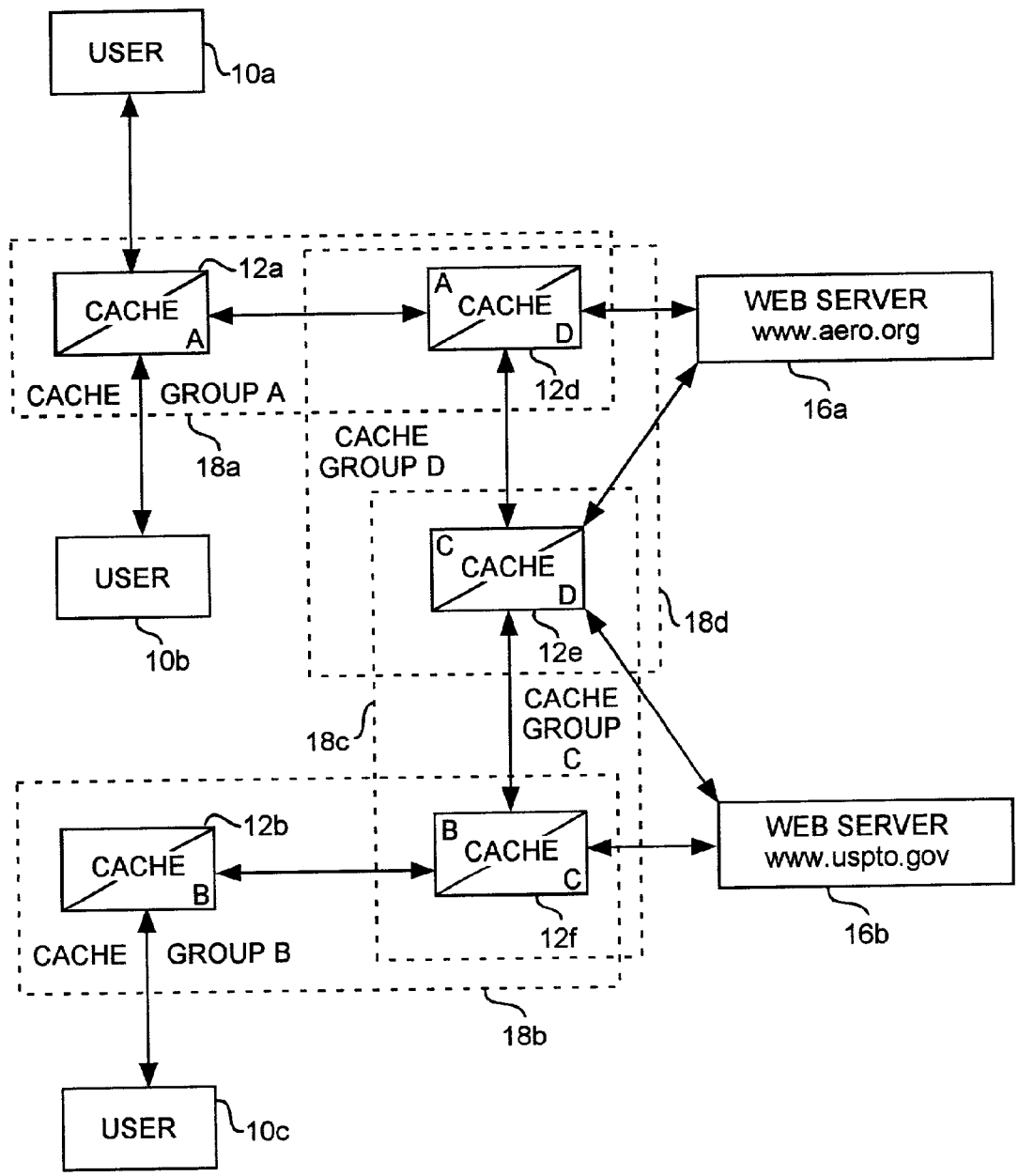
FIG. 2 is a diagram of an application level network.

Referring to FIGS. 1 and 2, web caches 12 may be cooperatively grouped into cache groups, such as, cache group A 18a, cache group B 18b, cache group C 18c, and cache group D 18d, collectively referred to as cache groups. Each of the cache groups contains one or more cooperative caches. Each of the cooperative caches can be assigned to one or more cache groups. The cache groups can be configured to be overlapping in that a particular cooperative cache, such as the C-D cache 12e, can be assigned to two cache groups, such as the cache group C 18c and the cache group D 18d. As such, an application level network can be flexibly configured in a variety of cache grouping structures, an example of which is shown in FIG. 2. The cache grouping structure enables communication with cooperating distal caches in overlapping cache groups, but not with stand alone caches that operate independently of other caches, such as independent cache 12c. Hence, the grouped caches are cooperating caches within assigned cache groups. Cooperating caches within a cache group can locally store web server content data or access web server content information from another cooperating cache within the cache group. By overlapping cache groups, a cache from one group can access web content data from a cache in another cache group through overlapping cache group topography by relaying requests through one or more caches connecting cache groups together and between the caches within the same group, effectively relaying the URL requests between all caches within overlapped cache groups.

When a grouped cache receives a request for locally stored web content data, the grouped cache transmits the web content data back to the requesting user or locally grouped cache. When a grouped cache receives a request for web content data that is not stored locally, the grouped cache relays the request to a distal cache within the local group of caches, which the distal cache may further function as a forwarding cache to relay the URL request to yet another distal cache, and in so doing, the request may propagate through a plurality of overlapping cache groups until the request is received by a cache storing locally the requested web content data. In the event that no cache within the overlapping cache groups stores the requested web content data, the receiving cache communicates the requests directly to the web server permanently storing the requested web content data.

Figure 3:
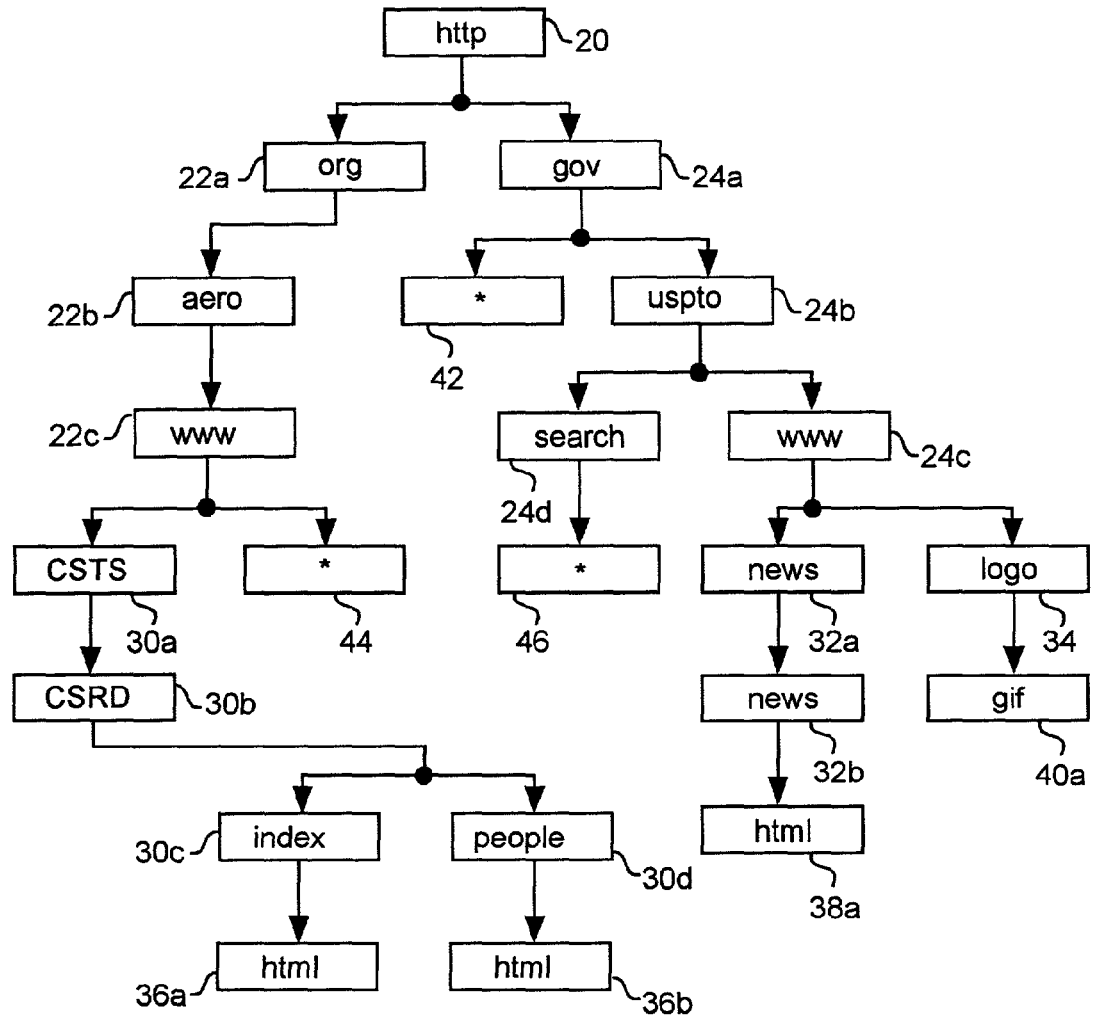
FIG. 3 is a diagram of a uniform resource locator (URL) decomposition tree.

Referring to FIGS. 1, 2 and 3, and more particularly to FIG. 3, in the preferred form, each cache stores the URLs corresponding to requests for respective web content data of the web servers using a URL decomposition tree. A URL is decomposed by the decomposition tree into the scheme, name, path and type URL portions having one or more components. The scheme portion has one scheme component that may be, for example, the http scheme 20. The name portion may have one or more name components, for example, www 22c, aero 22b, and org 22a, or www 24c, uspto 24b, and gov 24a, or search 24d, uspto 24b, and gov 24a. The scheme component and name components are separated by a :// delimiter character string. The name portion is typically partitioned into several name components. The name components are separated by delimiter periods and combined as a string of components to form a unique name, such as, www.aero.org, www.uspto.gov, or search.uspto.gov. Likewise, the path portion may also be partitioned into one or more path components such as CSTS 30a, CSRD 30b, index 30c, or CSTS 30a, CSRD 30b, and index 30c, or CSTS 30a, CSRD 30b, and people 30d, or news 32a and news 32b, or logo 34. The path components are separated by respective delimiter slashes. The type portion is typically only one type component, such as html 36a, html 36b, html 38a and gif 40a and identifies the format type of the web content data. The scheme and type portions are typically not partitioned into smaller components. The file type component follows the last path component separated by another delimiter period. Exemplar URLs used in the FIG. 3 of an exemplar URL decomposition tree include http://www.aero.org /CSTS/CSRD/index.html, http://www.aero.org/CSTS/CSRD/people.html, http://www.uspto.gov/news/news.html, and http://www.uspto.gov/logo.gif.

The decomposition tree is in effect a hierarchical file name structure, the preferred form of which has the name components in reverse order but with the path components in forward order, even though forward, reverse or any arbitrary hierarchical component ordering could be used. In the preferred form, the org and gov, and like ending name components appear at the top of the name portions within the decomposition tree so that the decomposition tree structures the file name by associated sets. Name grouping and path grouping into sets is perfected in the preferred form using a wildcard character, such as an asterisk. Hence, for each set of names, such as the gov 24a set of names, an * asterisk extension 42 is used to identify all names within the gov name set. Likewise, the URL name may be referenced to a plurality of files containing respective web content data that are addressed using a set of path components, all of which can be identified as a set using the * wildcard. In the exemplar form, a * wildcard 44 is used to reference all files in the www.aero.org set of files, including the CSTS/CSRD/index.html and CSTS/CSRD/people.html files, and another * wildcard 46, for example, is used to identify all files within the search.uspto.gov name. In this manner, the decomposition tree can identify an individual URL or sets of URLs.

Referring to FIGS. 1, 2, 3, 4a and 4b, more particularly to FIG. 4a, in the preferred form, a decomposed URL may be encoded by transformation into a numerical value using a hashing function. A hashing function transforms and maps an input string into a numerical value within a predetermined mathematical range. The input string may be structured as characters or as an arbitrarily long sequence of bits. In the preferred form, the input string is a sequence of concatenated successive URL components, including or excluding the delimiters. In the preferred from, only the last delimiter between the last path component and the file type component is used while the remaining delimiters are ignored during hash encoding. Each sequence of concatenated successive URL components comprises a URL segment. In the preferred form, the first hash code h1 is generated by applying the hashing function to the first URL component, that is, the scheme component, such as the http string of characters, as a minimal first URL segment. The second hash code h2 is generated by applying the hashing function to the first two URL components as successive concatenated strings, that is, the httporg string, without the :// delimiter, as a second hashed URL segment. The third hash code h3 is generated by applying the hashing function to the concatenation of the first three URL components as a string consisting httporgaero, without the :// and period delimiters resulting in the concatenation of the first three URL components http, org, and aero as a third hashed URL segment. The fourth hash code h4 is generated by applying the hashing function to the first four URL components http, org, aero and www as a concatenated string httporgaerowww, without the delimiters as yet a forth hashed URL segment. The fifth hash code h5 is generated by applying the hashing function to the first five URL components http, org, aero, www, and CSTS as a concatenated string of httporgaerowwwCSTS, without the delimiters as still a fifth hashed URL segment. The sixth hash code h6 is generated by applying the hashing function to the first six URL components http, org, aero, www, CSTS and CSRD as a concatenated string httporgaerowwwCSTSCSRD without the delimiters as a sixth hashed URL segment. The seventh hash code h7 is generated by applying the hashing function to the first eight URL components http, org, aero, www, CSTS, CSRD, people, and html as a concatenated string httporgaerowwwCSTSCSRDpeople.html as the final seventh hash URL segment covering the entire URL. Each concatenated URL segment may include delimiters, a preceding segment of URL components, and one or more additional URL components. Each hashed URL segment consists of one or more URL components and has a respective hash code. In the preferred form, the file type component of a URL, such as the .html component, including the period delimiter, is juxtaposed with the last path components of the URL, such as the people path component, including the period delimiter. The use of delimiters in the hashed segment and a juxtaposition of the plurality of URL components can vary in different forms of the invention, so long as the URL is broken down into a plurality of components for compiling the decomposition tree preferably with successive respective hashing codes generated for each URL concatenated segment. In the preferred form, for example, only the last one of the delimiters is used, and only the last path component and file type component are juxtaposed during the last hashing process to generate the last entry in the hashing table comprising a list of hash codes for respective concatenated URL segments.

The sequence of hash codes produced by successively concatenating decomposed URL components and delimiters and successively applying the hashing function are collectively an incremental URL hash code sequence. Hence, the sequence of hash codes h1, h2, h3, h4, h5, h6, and h7 represents an incremental URL hash code sequence as a URL identifier produced by decomposing the URL http://www.aero.org/CSTS/CSRD/people.html into the components http, org, aero, www, CSTS, CSRD, and people.html. Similarly, FIG. 4B enumerates the incremental URL hash code sequence h1, h2, h3, h4, and h8 produced by successively applying the hash function to the concatenated components ending with the * wildcard, such as the URL http://www.aero.org/*, including http, org, aero, www, and * components.

As shown in FIG. 4A and FIG. 4B, the hash function will always generate the same values, h1, h2, h3 and h4 for the first four decomposed URL components, http, org, aero, and www. The last hashing code h8 is generated from hashing the complete URL with the * wildcard as a final URL hash segment. A hashing function can produce the same numerical code values for different input strings, but will always produce the same sequence of numerical values for a given decomposed URL with the identical URL components. Hashing codes are used for addressing URL segments cross referenced to routing data and for reducing the storage requirements in order to maintain all possible cross references for all URL segments created by decomposing a plurality of URLs. The storage reduction benefit exceeds the cost for resolving, in rare cases, differing URLs having an identical hashing code sequence.

Figure 5:
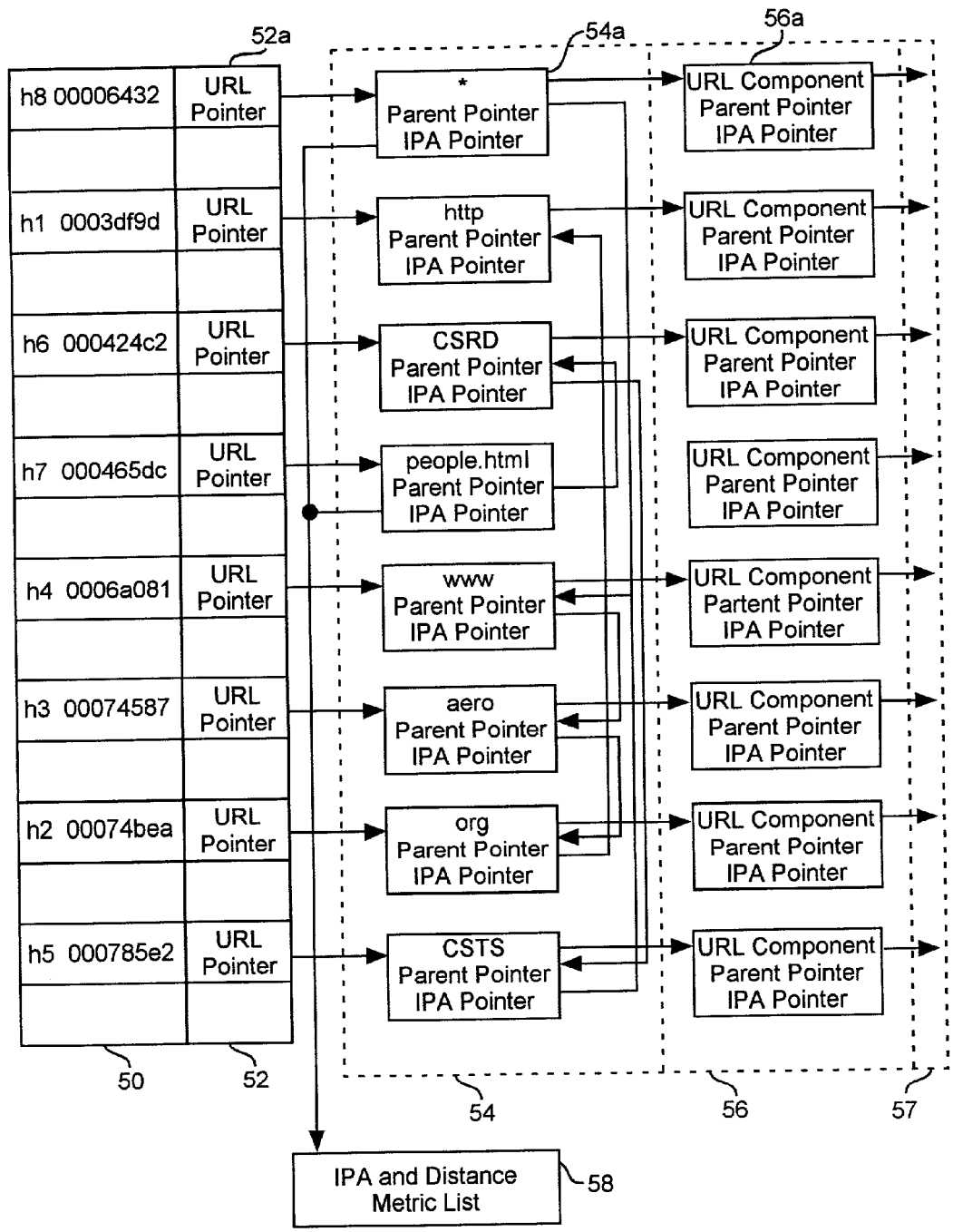
FIG. 5 is a diagram of a URL forwarding table.

Referring to FIGS. 1 through 5, and more particularly to FIG. 5, a URL forwarding table is used to translate received web request URLs into IPAs for forwarding web requests to the cooperative caches storing the requested web content data. The series of hashing codes 50 is a list of hash codes that are used as indices in the forwarding table. The series of hashing codes 50 are hashed values of at least one decomposed URL and respective URL segments. The series of hashing codes 50 are used for rapidly jumping from a present to successor URL component as the forwarding table is searched to match the longest initial sequence or prefix of URL components previously stored in the forwarding table to the URL components from the decomposed received web request URL. A pointer list 52 having URL pointers, such as URL pointer 52a, is referenced by the respective hashing codes 50. Each of the URL pointers 52, such as URL pointer 52a, points to one or more URL data segments, such as URL data segment 54a of the URL data segment list 54. Each URL data segment, such as the URL data segment 54a, is defined by a URL data segment structure. In the preferred form, the URL data segment structure comprises a URL component field, a parent pointer and an IPA pointer field. The URL component field indicates a present URL component of a last component of a concatenated URL segment from a decomposed URL stored in the forwarding table. The parent URL pointer field stores a pointer to a parent URL data segment corresponding to a parent URL component. The parent URL pointer points to that URL data segment of the URL component immediately preceding the present URL component of the decomposed URL having a plurality of URL components. The URL data segment structure association of the present URL components and the parent URL components enable the linking of decomposed URL components into the complete URL. That is, the parent pointers serve to link present URL components with parent URL components so that all of the parent pointers of a URL data segment list link all of the URL component data segments in URL data segment list such as URL segment list 54 of a respectively decomposed URL so that the entire URL can be reconstructed through parental pointer linkage. The linked URL data segments are mapped to respective URL pointers and to respective hashing codes so that the list of hash codes 50 can point to one or more URLs of the URL data segment list 54. Exemplar URL segment list 54 contains two URLs, one being an exact URL http://www.aero.org/CSTS/CSRD/people.html, and the other being a wildcard URL http://www.aero.org/*. Each of the pointers 52 point to one or more URL data segments in the URL data segment lists. For example, URL pointer 52a points to URL data segment 54a and 56a in respective URL data segment lists 54 and 56, as well as other data segment lists such as data segment list 57. Each hash code represents a hashing of a URL segment comprising one or more linked URL components. Each hash code is computed for a respective URL segment with the hashed URL segment generating a respective hash code, URL pointer and present URL component. Only the first URL data segment does not have a parent URL component, and only the last URL data segment has an associated IPA pointer, so that, an entire URL from the first URL component to the last URL component can be formed by following the linked parental pointers between the first and last linked URL data segments with the reconstructed URL having an associated IPA pointer for locating in an IPA and distance metric list 58, the IPA location of a cooperative web cache or web server storing the web content data identified by the reconstructed URL. By way of example using the exact URL http://www.aero.org/CSTS/CSRD/ people.html, the first http data segment would have no parental pointer, and the people.html last URL data segment would have an associated IPA pointer for pointing into an IPA and distance metrics list 58. In this exact URL example, the last two URL components and the last delimiter are grouped together during decomposition. By way of another example using the wildcard URL http://www.aero.org/*, the first http data segment also has no parental pointer, and the last wildcard character * data segment has an associated IPA pointer for pointing into the IPA and distance metric list 58 for locating the IPA of the web server or cooperative web cache distally storing the sought after set of web content data identified by the reconstructed wildcard URL stored in the forwarding table. The IPA and distance metric list 58 includes a list of IPAs and respective distance metrics that indicate the number of web cache hops from the proximal requesting web cache through any number of cooperative forwarding caches to that distal web cache or web server containing the URL identified web content data.

Figure 6A:
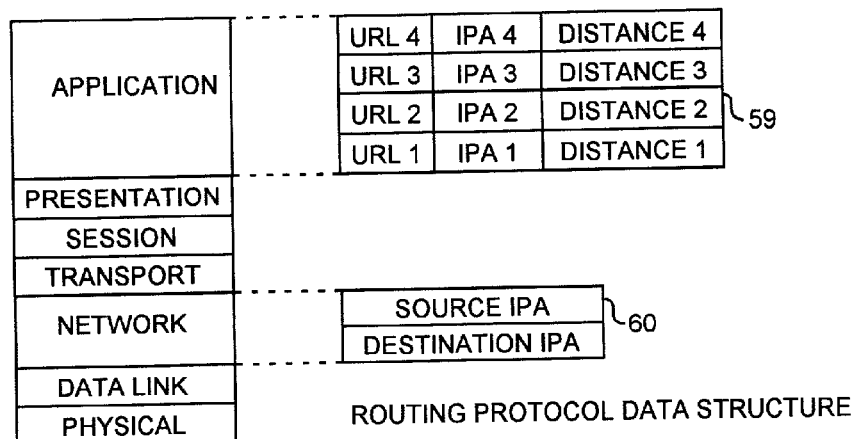
FIG. 6a is a diagram of a routing protocol data structure.

Referring to FIGS. 1 through 6A, more particularly to FIG. 6A, a proximal web cache communicates URL network accessible data by broadcasting routing protocol packets comprising the source and destination IPAs 60 and a routing protocol forwarding list 59 to one or more distal caches located within the local cache group. A URL and the respective web content data is accessible by a proximal source web cache when either the proximal source web cache locally stores replicated web content data or the proximal source web cache received a routing protocol packet from a distal source web cache communicating URL accessible data, thereby identifying the URLs and respective web content data accessible by the proximal source web cache. The routing protocol packet contains a web cache source IPA and a web cache destination IPA 60 for communicating the routing protocol forwarding list 59. The web cache source IPA and a web cache destination IPA 60 are used by network routers to communicate the routing protocol packet from a web cache or web server identified by the source IPA to a distal web cache identified by the destination IPA. Along with the source IPA and destination IPA 60, the router transports the routing protocol forwarding list 59 containing a list of routing line items each consisting of a URL identifier, such as URL 1, a distal web cache location, such as IPA 1, of the proximal source cache that relays or stores locally the replicated web content data identified by the web content identifier, and a web cache distance metric, such as distance 1, indicating the distance in web cache hops between the broadcasting proximal source web cache and a distal web cache storing the web content data. When a source cache containing sought after web content data belongs to two or more different cache groups, this web content data is accessible by any web cache within these different cache groups by using the caches connecting overlapping cache groups as an intermediary communicating cache to interconnect the cache groups for communication between cache groups and consequently communicate with the source cache. Hence, the routing protocol forwarding list 59 indicates both replicated web content data stored locally by the broadcasting proximal source web cache and the replicated web content that may be retrieved via the proximal source web cache using the proximal source cache as an intermediary, such as when the proximal source web cache interconnects to two or more web cache groups and the sought after web content data is stored by a distal web cache in a distal web cache group relative to the distal caches in the proximal source cache group to which the broadcasted routing protocol is directed. The routing protocol forwarding list 59 is broadcasted to the distal web caches at the destination IPA and informs the distal web caches of what web content data is replicated and stored or may be retrieved by the proximal source web cache. The routing protocol forwarding list 59 may contain multiple line item entries for the same URL identifier with different distal web cache locations, representing multiple paths through the interconnected web groups to the same or different distal web caches, enabling a proximal web cache to select that path with the lowest path distance metric. In the preferred form, the proximal source IPA in the forwarding list identifies the proximal source cache as a forwarding cache or as the distal cache storing the respective web content data. Alternatively, the routing packet source IPA can be used to identify the broadcasting proximal source cache such as when the source cache is a forwarding cache for web hops while the routing line item contains the distal IPA of the proximal or distal cache or web server storing the web content data.

Figure 6B:
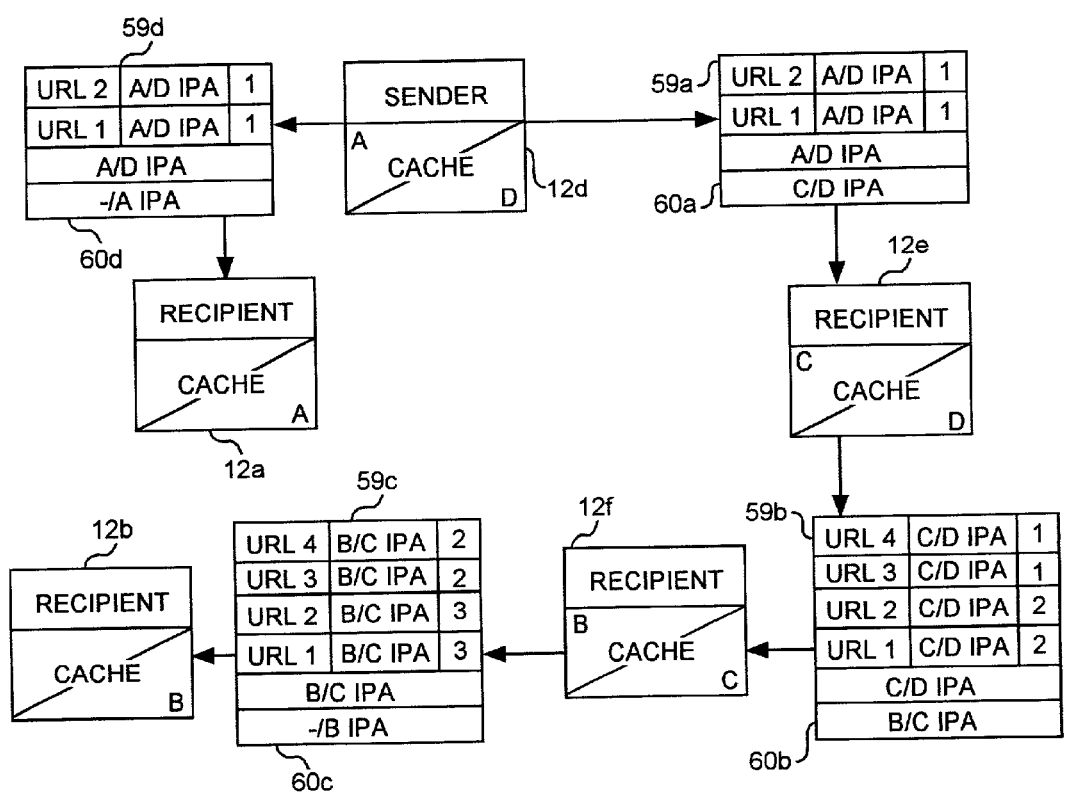
FIG. 6b is a diagram of a routing protocol message sequence.

Referring to FIGS. 1 through 6B, more particularly to FIG. 6B, by way of example, the proximal A/D web cache 12d has previously stored locally the replicated web content data corresponding to URL identifiers URL 1 and URL 2, and creates routing protocol forwarding lists such as lists 59a and 59d, with two line item entries. The first line item entry contains URL 1, the originating A/D web cache IPA, and a web cache distance metric of 1. The distance metric of 1 indicates that the number of web cache hops from the currently receiving distal web cache, such as the -/A distal web cache 12a or the C/D distal web cache 12e, to the originating web cache, such as proximal web cache 12d, where the web content data is locally stored. The second entry contains URL 2, the originating web cache A/D IPA, and a web cache distance metric of 1. The first two entries in the forwarding lists 59a and 59b indicate that web cache A/D 12d is the originating proximal web cache storing the URL referenced web content data, namely the web content data respectively referenced by URL 1 and URL 2. Web cache A-D 12d, a member of cache groups A and D, broadcasts two routing protocol data structure packets containing the IPAs 60a and 60d, and respective forwarding lists 59a and 59d to respective distal web cache 12a of cache group A and distal web cache 12e of cache groups C and D. With the first forwarding list 59d, the source IPA of the routing packet is the IPA of originating A/D web cache 12d and the destination IPA of the routing protocol packet is distal /A web cache 12a. With the second forwarding list 59a, the source IPA of the routing protocol data structure packet is also the IPA of originating A/D web cache 12d and the destination IPA of the routing data structure packet is the IPA of the distal C/D web cache 12e. The difference between the two forwarding lists 59a and 59d from the originating web cache 12a is that the associated destination IPAs are different for routing and communicating the routing protocol forwarding list 59a and 59d to two different receiving distal web caches, such as distal web caches 12a and 12e.

Upon receiving the routing protocol packet, the recipient destination distal web cache such as the C/D cache 12e, broadcasts an updated forwarding list 59b with new line item entries, such as two additional to entries corresponding URL identifier URL 3, the IPA of cache C-D 12e, and a distance metric of 1, and corresponding to the web content data URL 4, the IPA of cache C-D 12e, also with a distance metric of 1 indicating the originating distance metric of 1 for the locally stored web content data respectively referenced by URL 3 and URL 4. The new routing line items may also be inserted or updated with another web cache IPA and distance metric for indicating that the web content data referenced by the line item URL identifier is also stored in another web cache that may have a lower metric and is more proximal to the local web cache that is updating the forwarding list. Hence, the forwarding list 59*b* of the routing protocol packet provides wide area linkage through which cooperating web caches communicate network accessible web content data for forwarding and routing of future web requests using URL identifiers, IPAs and distance metrics for referencing replicated web content data stored within the network of cooperative web caches.

The forwarding list 59 of a broadcasted routing protocol data structure packet can increase in the number of line items when relayed from one web cache to another web cache as the routing protocol packet propagates through the network of cooperative web caches during broadcasting. For example, the web C/D cache 12*e* increments by one the web cache distance metric of the first two forwarding list entries received from cache A/D 12*d* such that the forwarding list entry corresponding to URL1 becomes distance 2 and the forwarding list entry corresponding to URL2 becomes distance 2, thereby indicating an increment of the web hop distance to the originating web cache 12*d*. A new and updated routing protocol packet containing the four entry forwarding list 59*b* is broadcasted with the source IPA of cache C/D 12*e*, and the destination IPA of B/C cache 12*f*. The updated routing protocol packet with forwarding list 59*b* is broadcasted by the C/D cache 12*e* to the B/C cache 12*f*. Upon receiving the routing protocol packet from the C/D cache 12*e*, B/C cache 12*f* does not add any additional forwarding list entries in the shown example. However, the B/C cache 12*f* creates a new forwarding list 59 by copying the forwarding list received from cache C/D 12*e*, and increments the web cache distance metrics of the forwarding list 59*c*, that is, the distance metric corresponding to the forwarding list entry containing URL1 becomes distance 3, the distance metric corresponding to the forwarding list entry containing URL2 becomes distance 3, the distance metric corresponding to the forwarding list entry containing URL3 becomes distance 2, and the distance metric corresponding to the forwarding list entry containing URL4 becomes distance 2. The B/C cache 12*f* broadcasts the updated routing protocol packet to the -/B cache 12*b* with the updated forwarding list 59*c*, with the source IPA of the B/C cache 12*f* and the destination IPA of the B cache 12*b* of IPA data 60*c*. In this manner, routing protocol lists 59 can be updated and propagated through a hierarchy of network distributing grouped web caches for identifying network accessible web content data.

Broadcasting routing protocol packets and incrementing the web cache distance metric of each entry contained in the routing protocol forwarding list provides a recipient web cache with the exact and wildcard URL identifiers of web content stored by distal caches, the IPA of the proximal forwarding or distal cache, and a distance metric for indicating of how many web hops away the forwarding or distal web cache is from the distal web cache that locally stores the sought after web content data corresponding to the URL identifier. Latency reduction is adaptively enabled by comparing the distance metrics received from multiple routing protocol packets received from multiple and differing web cache sources for a particular URL contained in the received forwarding list to the distance metric stored in the IPA and distance metric list 58 such that a recipient cache can update the IPA and distance metric list when the same URL is referenced to another web cache having the lower distance metric in web cache hops from the recipient web cache to the originating distal web cache storing the sought after web content. In this manner, URL request response times are adaptively reduced by maintaining the IPA and distance metric list 58 to have the minimum distance metric values for each of the respective IPAs in the list 58.

The URL identifiers contained in a routing protocol data structure forwarding list may equivalently be expressed as either an exact URL, as a wildcard URL, or as an encoded URL such as a hash code in the preferred form using a sequence of hash codes for the respective concatenated URL segments. When communicated in a routing protocol packet, exact and wildcard URLs may be equivalently identified by a sequence of hash codes generated by the same hashing function used to insert URL data segment structures into a proximal cache forwarding table. URL hash codes are stored in a code list 50 in the proximal cache forwarding table for indexing the URL data segment lists 54, 56 and 57 for linkage determination through parental URL data segments to the last URL data segment pointing the IPA of a forwarding cache for web hops or a distal cache where the sought after web content data is distally but there locally stored. However, the URL component field of the URL data segments may be left empty because the URL component is not known and cannot be reconstructed from the hash codes. Only the hash code is known as a URL identifier, but the URL data segments are still linked for determining if the URL web content data is accessible in the network of web caches. When a proximal cache looks up the requested URL in the forwarding table, the parent URL component fields enable the proximal cache to determine whether or not a given sequence of hash codes generated by a decomposed URL is present in the forwarding table, and consequently determine a forwarding cache IPA or distal cache IPA where the sought after web content data is located, even though the URL components in each URL data segment structure are unavailable. URL codes enable a compressed representation of exact and wildcard URLs, thereby reducing the size of the routing protocol packets communicated from a proximal source web cache to distal recipient web caches when the proximal source web cache broadcasts the routing protocol packets to the distal recipient cooperative web caches in the proximal web cache group.

Figure 7:
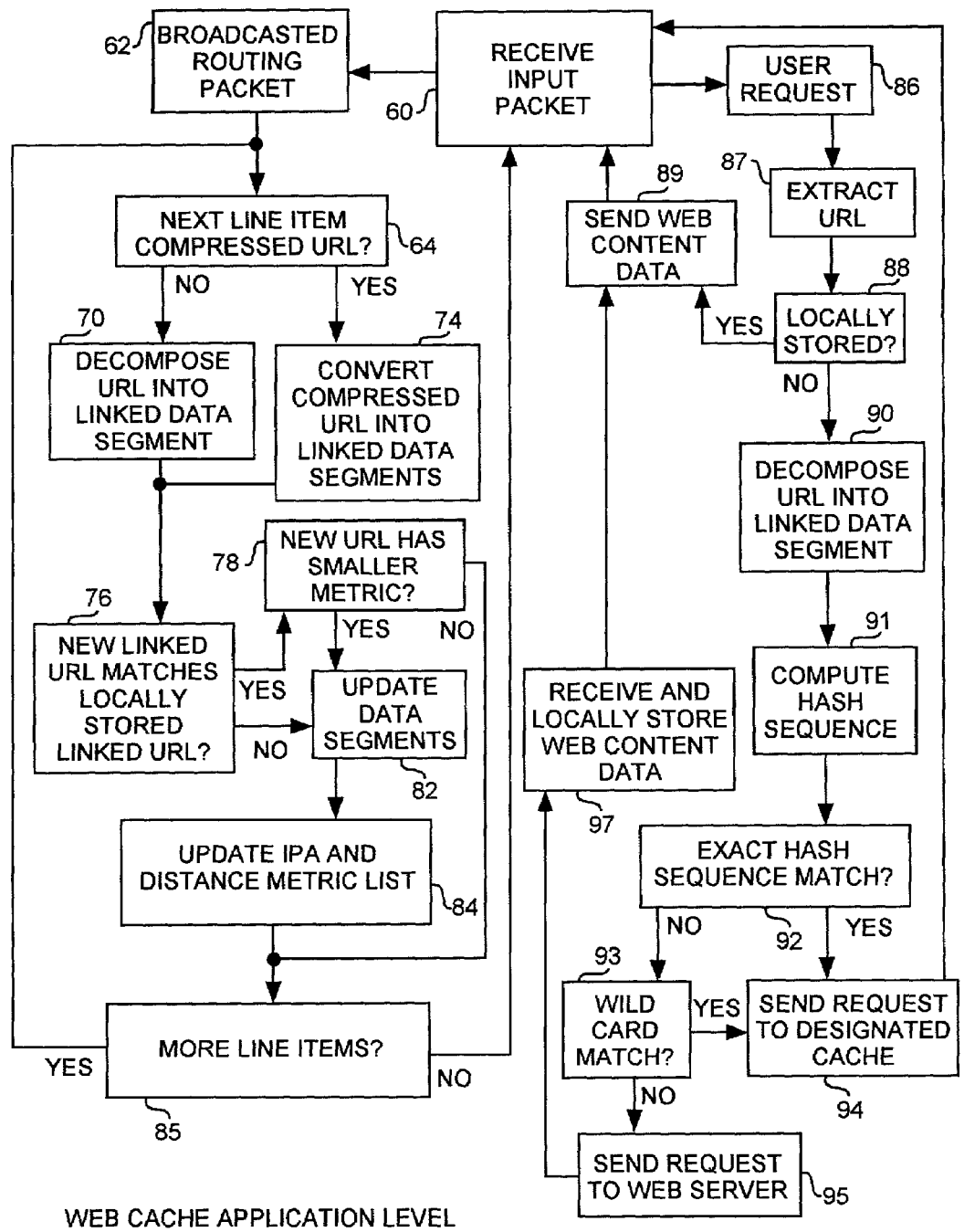
FIG. 7 is a flow diagram of the web content caching application level routing and forwarding process.

Referring to FIGS. 1 through 7, more particularly referring to FIG. 7, a proximal web cache receives and classifies input packets 60. One type of input packet is the routing protocol data structure packet 62. Upon receiving and classifying an input packet as a routing protocol packet 62, the proximal cache examines the routing protocol forwarding list and examines each line item URL identifier to determine 64 whether the line item contains an exact or a wildcard 70 or a compressed URL 74 represented by URL codes. If the URL identifier is an exact or wildcard URL, the proximal cache decomposes 70 the URL into linked data segments having URL components. If the URL identifier is a compressed URL, the proximal cache converts 74 the compressed URL into linked data segments where the URL components are empty place holders within a temporary list of linked URL data segments. The IPA field of last URL data segment structure from the decomposed or converted URL is updated with the IPA of the distal cache IPA contained in the current line item so as to complete the list of linked data segments. Then the temporary list of linked data segments is compared to the lists of linked data segments 54 in the forwarding table to determine 76 whether the temporary list of linked data segments of the current line item are matched to a previously stored list of linked data segments 54. If the temporary list of linked data segments are matched 76, meaning the web content identifier of the current line item was previously stored in the forwarding table, then the distance metric of the current line item is compared 80 with the distance metric of the previously stored distance metric of the previously stored web content identifier to determine 80 whether the new distance metric is smaller, thereby indicating that a web cache storing the web content data referenced by the current line item web content identifier is closer in web cache hops than a web cache referenced by a previously stored web cache IPA. If matched 76, and the previously stored web cache IPA is closer, that is, the previously stored distance metric is smaller 80 than the current line item distance metric, then the forwarding table and IPA and distance metrics table are not updated, and the proximal cache determines 85 if there are any more line items to be examined, and if so, then the next line item 64 is processed, and if no more lines items are present 85, the web cache waits 60 for the next input packet. If the temporary list of linked data segments is not matched 76, meaning that the current line item represents newly stored web content data within the network of cooperative caches, the forwarding table is updated 82 with the new list of linked data segments and the IPA list 58 is also updated 84 with the new IPA and new respective distance metric. In the case of no match 76, the newly decomposed or converted linked data segments are added 82 to the forwarding table. If the temporary list of linked data segments is matched 76 and the new distance metric is smaller 80 in web hops for the web content identifier of the current line item, meaning the associated web content data of the current line item is closer with a smaller number of web hops through intermediate forwarding caches, the forwarding table is updated 82 with the temporary list of linked data segments and with a new IPA pointer, and the IPA pointer and metric list 58 is also updated 84 with the new IPA and new respective distance metric. In the case of a match 76 with a smaller distance metric, the list of linked data segments may be replaced with updated information such as with exact URL component data. When the forwarding table is updated 82 with additional or replacing linked data segment lists, then the IPA and distance metrics list 84 is also updated. In this manner, the forwarding table is updated with linked data segments of new line items having URL identifiers of web content data that has been newly stored within the group of cooperative web caches or has been stored in a web cache closer in fewer number of web hops to the proximal web cache than a more distal web cache previously storing the web content data. After updating the forwarding table 82 and 84, the proximal cache determines 85 if there are any more next line items 64, and if not waits 60 for the next input packet.

Another type of packet that is received 60 is the user request packet 86. When the proximal cache receives a user request packet 86, the proximal cache extracts 87 the exact URL from the user request packet. The proximal cache determines 88 whether the web content data identified by the exact URL extracted from the user request packet is locally stored 88, and if so, sends 89 the sought after web content data to the user and waits again 60 for the next input packet. If the web content data is not locally stored 88 by the proximal cache, the extracted exact URL from the user request packet is decomposed 90 into a list of data segments and encoded into a hash code sequence 91. The hash code values for the URL segments corresponding to the successive concatenated URL components are computed 91. The hash codes and data segments are examined 92 to determine if the hash code sequence and hence the URL data segments are matched 92. The proximal cache performs a lookup in the forwarding table to determine if a list of URL data segment structures corresponding to the respective URL code is stored in the forwarding table 92.

If an exact match is found 92 in the forwarding table with a list of URL data segment structures with empty URL components acting as place holders representing the respective compressed URL, the proximal cache transmits 94 the original user request to the forwarding or distal cache referenced by IPA field of the last URL data segment structure of the list of URL data segment structures of the respective compressed URL and again waits 60 for the next input packet. If the list of URL data segment structures corresponding to the URL components respectively corresponding to the extracted and decomposed exact URL is found 92 in the forwarding table, the proximal cache transmits 94 the original user request to the forwarding or distal cache IPA referenced by IPA field in the last URL data segment structure corresponding to the extracted and decomposed exact URL from the user request packet, and again waits 60 for the next packet.

If an exact match with a list URL data segment structures corresponding to the respective URL code is not found 92, the proximal cache performs a wildcard lookup 93 in the forwarding table to determine if the list of URL data segment structures corresponding to the URL components matching the respective extracted and decomposed exact URL from the user request packet is present in the forwarding table. If the list of URL data segment structures corresponding to URL components from the extracted and decomposed exact URL is not present in the forwarding table, the last component in the list of URL components corresponding to the decomposed URL extracted form the http message is replaced with a wildcard character component, creating a wildcard URL from the original URL extracted from the user request packet with the last path component removed. The proximal cache again performs a wildcard lookup 93 in the forwarding table using the list of URL components corresponding to the wildcard URL. If the list of components corresponding to the wildcard URL is present 93 in the proximal cache forwarding table, the proximal cache transmits 94 the original user request to the forwarding or distal cache IPA referenced by the IPA field of last URL data segment structure corresponding to the respective wildcard component in the decomposed wildcard URL. The proximal cache transmits 94 the original user request to the forwarding or distal cache IPA referenced by IPA field in the last URL data segment structure corresponding to the extracted and decomposed exact URL from the user http message and again waits 60 for the next packet.

If the list of URL components corresponding to the decomposed wildcard URL is not present in the forwarding table, the parent URL component of the wildcard component is removed from the list of URL components and replaced by the wildcard component and the proximal cache performs another wildcard lookup 93 into the forwarding table for a shorter prefix list of URL components corresponding to the URL prefix of the current wildcard URL. If the shorter prefix list of URL components is present in the proximal cache forwarding table, the proximal cache transmits 94 the original request to the forwarding or distal cache IPA pointed to by the IPA field of the last URL data segment structure corresponding to the wildcard character component of the respective URL prefix and again waits 60 for the next packet.

The proximal cache repeatedly removes 93 and replaces the last prefix parental component with the wildcard component so as to shift the wildcard component into the URL prefix of the URL component list and performs repeated lookups 93 until either the successively shorter prefix wildcard URL is found present in the forwarding table for sending the URL request to a forwarding or distal cache 94, or until the list of URL components consists solely of a scheme component and the wildcard character component. If the list of URL components consists solely of the scheme component and the wildcard component, the wildcard set is not present, and the proximal cache sends 95 the original user request http message to the web server and then waits to receive 97 the web content data identified by the URL of the user request http message, and stores the web content data locally 97, and then transmits 89 the web content data to the user identified by the user request packet source IPA, and again waits 60 for the next input packet. In this manner, exact and wildcard URL identifiers found in the forwarding table are used to send user requests 94 to a forwarding cache or to a distal cache storing the sought after web content data, preferably transmitting through one or more intermediary forwarding caches interconnecting cache groups. There are many variations possible to the processing of received packets. For example, certain error messages may be communicated back to the user. The first URL component, that is, the scheme component, may be examined 92, and if the scheme is not recognized or supported by the proximal cache, the proximal cache may send an error indication packet 89 back to the requesting user and wait 60 for the next packet.

As may now be apparent, the invention provides enhanced forwarding of URL requests and broadcasting of forwarding lists among web caches that function as a network of cooperating web caches yet further simply function as stand alone caches. A request receiving proximal cache may operate as a conventional stand alone cache when receiving a user request from a user. When receiving a URL request, the proximal cache determines whether the sought after URL web content data is stored locally within the proximal cache. If the user requested URL web content data is stored locally within the proximal cache, the URL content data is communicated back to the user.

The invention enhances web caching with URL request forwarding using a forwarding table and with routing list broadcasting preferably using the same forwarding table that preferably uses compressed URL identifiers and a decomposition tree for cross referencing the URL identifiers to forwarding and distal web cache IPAS. The proximal web cache contains a forwarding table for cross referencing URL to IPAs for locating cooperative distal web caches that store the sought after web content data. When the received URL request of the sought after web content data is not cross referenced to an IPA in the proximal web cache, the proximal web cache continues to function as a stand alone cache and directly retrieves web content data from the web server that originally and permanently stores the requested web content data by addressing the web server using the conventional domain name system (DNS) protocol that translates the web server name into a web server IPA. To communicate with the web server, the web cache is identified using the web cache IPA and communicates with the web server identified by the web server IPA using the necessary transport and application protocols appropriate for retrieving the web data content identified by the respective URL. When the proximal web cache stores the web content data from the web server, the proximal web cache continues to function as a stand alone cache and the forwarding table of invention need not be updated when storing requested web content data from web server as forwarding the URL request is not needed as the web content data is now locally stored. However, for efficient broadcasting of the routing protocol list, the forwarding table data structure may also be used to keep track of locally stored web content data for the efficient generation of protocol routing lists having both proximal and distal web cache routing information.

In a first aspect of the invention, the receiving proximal web cache functions to forward URL requests to cooperative distal caches that in turn provide the requesting user with the sought after web content data. The forwarding table is used by the proximal cache to recognize those URLs having corresponding web content data stored in the distal web caches. The user request receiving proximal web cache efficiently locates users requested web content data that has been previously stored in the cooperative distal web caches using the forwarding table cross referencing the URL request to the forwarding or distal cache IPA. When the sought after web content data is not stored in the proximal web cache, and when the requested URL is cross referenced to a forwarding or distal web cache IPA of a cooperative web cache, the proximal web cache communicates the URL request to the forwarding or distal web cache that distally but there locally stores the requested web content data. The distal web cache may then send the requested web content data directly to the requesting user.

In response to a cooperatively routed URL request, the distal web cache can also send the requested web content data to the relaying proximal forwarding web cache as well. The forwarding table in the proximal web cache can further be used to keep track of proximately stored web content data when the proximal web cache adaptively replicates requested web content data received from a distal web cache in response to frequent requests or anticipated user activity. The proximal web cache can update the forwarding table accordingly with proximately stored web content data so that the forwarding table contains routing data indicating both proximately and distally stored web content data.

In a second aspect of the invention, the proximal web cache may further function to broadcast routing information to cooperative forwarding and distal web caches that can then adaptively update the distal locally stored forwarding tables to provide adaptive updates throughout the distributed network of cooperative web caches for efficient subsequent routing of URL requests from cooperative proximal web caches to forwarding web caches and to distal web caches in the application level network of adaptive cooperative distributed web caches. A routing protocol is used to broadcast forwarding lists between the cooperative web caches. The forwarding list indicates the cooperative forwarding web caches or the distal web caches that store the web content data and indicates the URLs of the web content data. The web cache routing protocol is defined by a routing protocol data structure. A sequence of protocol packets are exchanged between the cooperative web caches during broadcasting of the forwarding lists. The routing protocol includes the source IPA of the broadcasting proximal cache, the destination IPA corresponding to a one or more recipient cooperative web caches in a local group of web caches each of which may be assigned to one or more groups of caches for hierarchical routing. The routing protocol also includes the forwarding list comprising URL identifiers and respective cache distance metrics. The URLs and IPAs respectively identify the sought after web content data and the location of cooperative forwarding web caches or storing distal web caches. The distance metric indicates the number of required web cache hops from the proximal broadcasting web cache through forwarding web caches to the storing cooperative distal web cache for efficient URL request forwarding to the nearest distal web cache storing the sought after web content data. During broadcasting through intermediate cache hops, the distance metric is incremented so that the current value of the distance metric is equal to the number required web cache hops from the broadcasting cache so that each recipient cache can in turn determine the required number of hops to the storing cooperative distal web cache. The distance metric, and hence, the number of web cache hops, is incremented when traversing from one to another local group of cooperative web caches with the cooperative web caches being organized into overlapping groups of web caches that define the web caching topology. The web cache topology is created by the overlapping cache groups to enable caches to communicate throughout the network of distributed cooperative web caches. A proximal cache may periodically broadcast routing information to the distal caches in the local cache groups in which the proximal cache is a member. A cache within one cache group can broadcast routing information to all other caches within the local cache group including those assigned to multiple cache groups for communication between groups of web caches. In this manner, routing information can propagate through the one or more groups of cooperative web caches throughout the entire network of cooperative web caches. Both URL request forwarding of the first aspect of the invention, and forwarding list broadcasting of the second aspect of the invention are directed to the efficient location of web content data in a network system of adaptive cooperative distributed web caches using an application level web cache routing protocol.

A third aspect of the invention is the use of decomposition of exact and wildcard URLs into a sequence of URL components to efficiently represent a URL decomposition tree in the proximate web cache forwarding table. An exact URL is a character string that is decomposed into a sequence of linked URL components. The URL components reflect the hierarchical naming convention defined by the conventional domain naming system (DNS). A decomposed exact URL is a sequence of components consisting of a scheme, name, path, and file type components. A wildcard URL is a string composed of either the scheme, name, and path components terminated by a wildcard character or the scheme and name components terminated by a wildcard character. The decomposed wildcard URL is a sequence of URL components consisting of the scheme and name components and optionally path components terminating with the wildcard component. A URL decomposition tree is formed by a plurality of URL data segment lists that store decomposed exact and wildcard URLs by URL components. The URL data segment lists preserve the sequential component ordering of decomposed exact and wildcard URL components. The forwarding table stores the URL decomposition tree by inserting the URL components within linked URL data segments of the lists of linked URL data segments that correspond to lists of linked URL components. A decomposed URL component is linked to the preceding decomposed URL component. The first decomposed URL component, that is, the scheme component, is not linked to a preceding decomposed URL component indicating the start of a decomposed URL. The final decomposed URL component is linked to the preceding decomposed URL component and is also linked to the IPA of the distal web cache and the web cache distance metric as might be indicated from a broadcasted routing protocol forwarding list. The decomposition tree of linked URL components with cross referenced forwarding or distal cache IPAs eliminates unnecessary duplication of decomposed exact and wildcard URL components already stored in the URL decomposition tree.

A fourth aspect of the invention is the use of encoding and preferably hash function encoding as a compression method for accessing and storing decomposed URLs in the proximal cache forwarding table. The hash function is applied to successive concatenated strings of URL components organized as URL data segments each of which corresponds to one or more successive URL components. The URL data segments may further include URL delimiters. The hashing codes, data segment pointers, and URL data segments are stored as lists in the forwarding table representing the URL decomposition tree. The sequence of hashing codes are used to compress the decomposed URL components into respective linked URL data segments each of which represents one or more linked URL components where the actual string of which may or may not be known. The URL forwarding table is a representation of the URL decomposition tree that can be used to rapidly and efficiently search for cross referenced IPAs of respective URLs using the hashing codes of the URLs to determine the IPA of a forwarding web cache or a distal web cache where the sought after web content data is locally stored. A decomposed URL is transformed into a sequence of hashing codes. The sequence of hashing codes indexing the pointers to successive respective decomposed linked URL data segments in the proximal cache forwarding table for reducing the time required to search the proximal web cache forwarding table to determine the IPA of the forwarding cache or distal cache where the sought after web content data is stored. When a URL is hashed into hashing codes and indexed to a complete decomposed URL by pointing to a respective linked series of URL data segments, the URL is found and hence cross referenced to the IPA and distance metric. The URL decomposition tree can be used for routing URL requests to distal web caches and can also be used to generate a routing protocol forwarding list during broadcasting.

The URL identifiers can be either actual URLs or encoded versions of the URLs, such as hashing code versions. When a sequence of hashing codes is received by a proximal cache, the sequence of hashing codes and a respective sequence of pointers are used to reference respective lists of URL data segments having parent pointers that function to link the URL data segments together for effectively linking together URL components that may or may not be present. When the sequence of received hashing codes are referenced through the pointers to a set of linked URL data segments forming a complete URL of linked but empty URL components, the last URL data segment contains the IPA pointer that points to the IPA in the IPA list used to forward a URL identifier to a forwarding cache or to that distal web cache storing the requested web content data corresponding to URL generating the received sequence of hashing codes. The forwarding table data structure, including the list of hashing codes, pointers, lists of URL data segments, and the IPA pointer list enable rapid location of IPAs of the cooperative forwarding cache or cooperative distal web cache storing the web content data for a given URL. A received URL can be quickly hashed for each URL data segment, and used as indices into the pointers list that in turn points to URL data segments for determining when a complete string of URL components are linked for locating the URL in the decomposition tree of the forwarding table. When a complete string of URL components are linked from a first component without a parental URL component through and to the last URL component having an associated IPA pointer, then the complete URL is determined to be found in the decomposition and is cross referenced to the IPA then found in the IPA list. When the URL is located with the associated IPA, then the proximal web cache can forward the URL or URL identifier to the cooperative web cache located by the IPA. The URL data segment lists are typically variable in length and are extended to various adaptive amounts that can change over time depending on the amount of information within the forwarding table and the quantity of URLs hashed so that the cooperative cache is an adaptive cooperative cache with a time variant size of the forwarding table. In the preferred form, the web content data identifiers include exact URL, wildcard URL or URL hashing codes that are a sequence of hash codes for respective concatenated URL segments. In the broad aspect, content data identifiers are cross referenced in forwarding tables to the source IPAs of proximal forwarding caches, distal web caches storing sought after replicated web content or web servers permanently storing the web content data. Those skilled in the art can make enhancements, improvements, and modifications to the invention, and these enhancements, improvements, and modifications may nonetheless fall within the spirit and scope of the following claims.

What is claimed is:

1. A method for retrieving from a destination web content data specified by a source at a source internet protocol address (IPA) and corresponding to a uniform resource locator (URL) associated with a web server, the method comprising the steps of,
    storing, at a proximal IPA, in a forwarding table a destination IPA,
    storing, at the proximal IPA, in the forwarding table a destination URL identifier for identifying the web content data, the destination URL identifier is stored in the forwarding table in reference to the destination IPA,
    receiving, at the proximal IPA, from the source a source URL identifier,
    matching, at the proximal IPA, the source URL identifier to the destination URL identifier,
    cross referencing, at the proximal IPA, in the forwarding table the stored destination URL identifier with the destination IPA, and
    transmitting, from the proximal IPA, the source URL identifier to the destination at the destination IPA for transmitting from the destination at the destination IPA the web content data to retrieve the web content data from the destination.

2. The method of claim 1 wherein,
    the destination is a distal web cache,
    the source is a user browser at a source IPA,
    the source URL identifier is an exact URL,
    the proximal IPA is an IPA of a proximal web cache,
    the distal web cache transmits the web content data to the source at the source IPA,
    the method further comprising the steps of,
    receiving the source IPA at the proximal web cache, and
    transmitting the source IPA to the distal web cache, the distal cache transmitting the web content data to the user browser.

3. The method of claim 1 wherein,
    the destination is a distal web cache,
    the destination IPA is a distal web cache IPA
    the source is a user browser at a source IPA,
    the source URL identifier is an exact URL,
    the destination URL identifier is an encoded URL,
    the proximal IPA is an IPA of a proximal web cache,
    the distal web cache transmits the web content data to the proximal web cache,
    the method further comprising the steps of,
    receiving the source IPA at the proximal web cache,
    transmitting the proximal IPA to the distal web cache,
    receiving from the distal web cache the web content data at the proximal web cache, and
    transmitting the web content data from the proximal web cache to the user browser at the source IPA.

4. The method of claim 1 wherein the destination URL identifier in the forwarding table is a series of compression codes corresponding to respective linked segments of the URL, each of the linked segments corresponding to one or more components of the URL to decompose the URL into the linked segments, the linked segments are linked by parental pointers from a first linked segment having no parental pointer through remaining linked segments having respective parental pointers to a preceding one of the linked segments to a last linked segment reference to the destination IPA.

5. The method of claim 4 wherein,
    the destination URL identifier references the URL comprising scheme, name, path and type components and delimiters,
    the linked segments correspond to successive concatenated components of the URL and are respectively referenced to one or more of the successive concatenated components of the URL,
    each of the compression codes are referenced to the linked segments and to the one or more successive concatenated components through pointers for respectively cross referencing the compression codes to the linked segments, and
    the destination IPA is referenced to the destination URL identifier when all of the respective compression codes through the respective pointers point to a complete set of linked segments from the first linked segment to the last linked segment.

6. The method of claim 5 wherein,
    the proximal IPA becomes a new source IPA as the destination IPA becomes a new proximal IPA communicating the destination URL identifier to a new destination IPA all of which occurring a plurality of times for indicating a number of hops from the proximal IPA to a last one of a respective plurality of new destination IPAs, the last one of the respective plurality of new destination IPA distally storing the web content data, and
    the last linked segment is further referenced to a distance metric indicating a number of hops through the new destination IPAs from the proximal IPA.

7. The method of claim 1 wherein,
    the destination stores a set of web content data one of which is the web content data, the set of web content data corresponding to a wildcard URL for indicating a set of URLs one of which is the URL,
    the destination URL identifier is a wildcard URL identifier, the source URL identifier is an exact URL having a plurality of URL components a first of portion of which serving as a prefix to a remaining portion of the exact URL, and
    the matching step is a prefix matching step for matching the first portion of the URL components of the exact URL to the wildcard URL identifier in the forwarding table.

8. The method of claim 7 wherein,
the prefix matching step is a longest prefix matching step serving to match the longest first portion of the URL components of the exact URL to the wildcard URL among a plurality of wildcard URLs matching a shorter first portion of the URL components of the exact URL.

9. A method for retrieving from a distal cache web content data specified by a user browser at a source internet protocol address (IPA) and corresponding to a uniform resource locator (URL) associated with a web server, the method comprising the steps of,
storing, at a proximal IPA, in a forwarding table a distal IPA,
storing, at the proximal IPA, in the forwarding table a distal URL identifier for identifying the web content data, the distal URL identifier is stored in the forwarding table in reference to the distal IPA,
receiving, from the user browser, a source URL identifier,
matching, at the proximal IPA, the source URL identifier to the distal URL identifier,
cross referencing, at the proximal IPA, in the forwarding table the stored distal URL identifier with the distal IPA, and
transmitting, from the proximal IPA, the source URL identifier to a destination at a destination IPA for transmitting from a distal web cache at the distal IPA the web content data to retrieve the web content data from the distal web cache.

10. The method of claim 9 wherein,
the web content data is transmitted from the distal cache to the user browser during the transmitting step.

11. The method of claim 9 wherein,
the proximal IPA is a location of a proximal cache,
the web content data is transmitted from the distal cache to the proximal cache during the transmitting step, and
the web content data is further transmitted from the proximal cache to the user browser during the transmitting step.

12. A method for retrieving from a distal web cache web content data specified by a user browser at a source internet protocol address (IPA) and corresponding to a uniform resource locator (URL) associated with a web server, the method comprising the steps of,
storing, at a proximal IPA, in a forwarding table a distal IPA,
storing, at the proximal IPA, in the forwarding table a distal URL identifier for identifying the web content data stored in a distal web cache, the distal URL identifier is stored in the forwarding table in reference to a destination IPA,
receiving, at the proximal IPA, from the user browser a source URL identifier,
matching, at the proximal IPA, the source URL identifier to a destination URL identifier,
cross referencing, at the proximal IPA, in the forwarding table the distal URL identifier with the destination IPA, and
transmitting, from the proximal IPA, the source URL identifier to a destination at the destination IPA for transmitting from the destination at the destination IPA the web content data for retrieving the web content data from the distal web cache.

13. The method of claim 12 further comprising the step of,
repeating all of the steps one or more times, the destination is one or more intermediate cooperative web caches having a respective one or more intermediate IPAs and respectively storing the distal URL identifier with a respective next one of the one or more intermediate IPAs and lastly the distal IPA, each of the one or more intermediate IPAs being a location of a next one of the one or more intermediate cooperative web caches and lastly the distal IPA, the one or more intermediate IPAs indicating next web hop locations in transmitting the distal URL through the intermediate cooperative web caches to the distal web cache, the last one of one or more intermediate cooperative web caches referencing the distal URL to the distal IPA for retrieving the web content data from the distal cache.

14. The method of claim 13 wherein the repeated transmitting step,
the web content data is transmitting from the distal cache through the one or more intermediate web caches and through a proximal cache at the proximal IPA to the user browser.

15. The method of claim 14 further comprising the step of,
assigning the proximal cache and one or more intermediate caches and the distal cache to one or more groups of cooperative caches in a network of grouped cooperative web caches, the web content data being transmitted from a first one of the one or more intermediate caches to a second one of the one or more intermediate caches, the first one and second one of the one or more intermediate caches being within the same group.

* * * * *